United States Patent

Singh

[15] 3,675,001

[45] July 4, 1972

[54] FAST ADDER FOR MULTI-NUMBER ADDITIONS

[72] Inventor: Shanker Singh, Beacon, N.Y.

[73] Assignee: International Business Machines Corporation, Armonk, N.Y.

[22] Filed: Dec. 10, 1970

[21] Appl. No.: 96,875

[52] U.S. Cl. ....235/175

[51] Int. Cl. ....G06f 7/50

[58] Field of Search ....235/175

[56] References Cited

UNITED STATES PATENTS

| | | | |
|---|---|---|---|
| 3,515,344 | 6/1970 | Goldschmidt et al. | 235/175 |
| 3,535,502 | 10/1970 | Clapper | 235/174 |

*Primary Examiner*—Eugene G. Botz
*Assistant Examiner*—David H. Malzahn
*Attorney*—Hanifin and Jancin and Robert J. Haase

[57] ABSTRACT

A fast adder for adding more than three numbers, the digits of each of which are arranged in groups in accordance with the expression $n = [\log_2 (k-1)]$ where:

$[\log_2 (k-1]$ is the smallest integer greater or equal to $\log_2 (k-1)$ $n$ = the number of digits in each group and $k$ = the number of numbers to be added.

The most significant digit of each group of digits comprising each number to be added is applied to an adder which directly produces a partial sum consisting of a sum digit and carry digits. In the next cycle of operation, the second most significant digit of each group of digits is applied to the same adder to produce a corresponding partial sum in the same manner. Then, the third most significant digit of each group of digits is applied to the same adder and so on until all of the digits have been processed. Each partial sum includes a number of digits having overlapping positional significance (weight) with respect to an equal number of digits of another partial sum. However, no more than two digits possess the same positional significance. Half of the digits from all of the partial sums are applied to a first register and the remainder of the digits are applied to a second register with appropriate positional significance. One additional cycle is required in order to apply the digits in the two registers to a carry look-ahead adder to yield the desired final sum.

5 Claims, 6 Drawing Figures

INVENTOR
SHANKER SINGH
BY Robert J. Haase
ATTORNEY

FAST ADDER FOR MULTI-NUMBER ADDITIONS

BACKGROUND OF THE INVENTION

Traditionally, computers are designed to add only two numbers at a time. Irrespective of the quantity of numbers to be added together, two of the numbers are added to produce a first subtotal, a third number is added to the first subtotal to produce a second subtotal and so on until each of the numbers to be added is processed in sequence and the final subtotal becomes the desired sum. This type of processing saves computer hardware but with the trade-off of prolonged computational time. As computer hardware becomes smaller in size and more reliable in operation with advances in microcircuit technology, emphasis can be shifted from questions of computational time to hardware size and reliability. It now behooves the system designer to find ways to achieve significant reduction in computational time while trading off moderate increase in hardware complexity.

SUMMARY OF THE INVENTION

Significant decrease in computational time is achieved in the addition of a multiplicity of numbers by a data processing procedure in which the numbers are added by the simultaneous addition of a sizable fraction of the constituent digits during each computational cycle.

In the classical paper and pencil method, the column of the least significant digits of all the numbers to be added is added first to produce a sum digit and carry digits. The carry digits are taken into account when the appropriate higher order significant digits of the same numbers are added later. A final desired sum is reached after a number of computational cycles equal to the number of digits in the longest number to be added. The present invention also is based upon the columnar addition of corresponding digits but rather than adding only one column of digits at a time, a plurality of columns of digits are added during the same computational cycle. The number of simultaneous columnar additions is equal to the number of digit groups into which each of the numbers to be added is divided. The number of digits ($n$) in each digit group is determined by the expression:

$$n = [\log_2 (k-1)] \text{ where:}$$

$[\log_2 (k-1)]$ is the smallest integer greater or equal to $\log_2 (k-1)$, $k$ = the number of numbers to be added.

The most significant digit column from each group of digit columns is added during the same computational cycle. The second most significant digit columns are added during the next computational cycles and so on until all of the columns are added. Adherence to the foregoing expression assures that no more than two digits possess the same positional significance. Half of all of the sum digits are stored in a first register and and remainder of the digits are stored in a second register in appropriate positional locations. The separation of the sum digits into two registers facilitates the use of a carry look-ahead adder which produces the final desired sum in one additional computational cycle. Thus, the final desired sum is achieved in a number of computational cycles equaling one more than the number of digits in each group of digits.

DESCRIPTION OF THE PREFERRED EMBODIMENT

Figure 1:
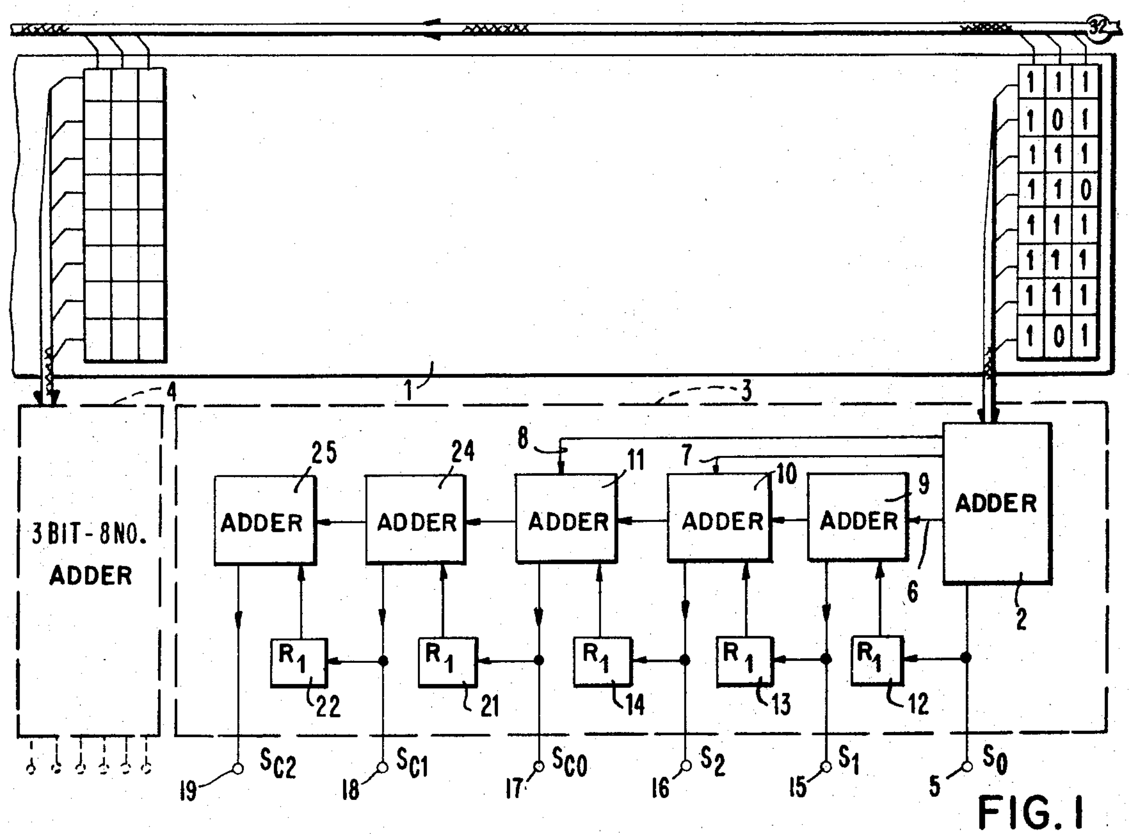
FIG. 1 is a simplified block diagram of the hardware logic required to process one group of digits of a multiplicity of numbers to be added in accordance with he present invention.
Figure 2:
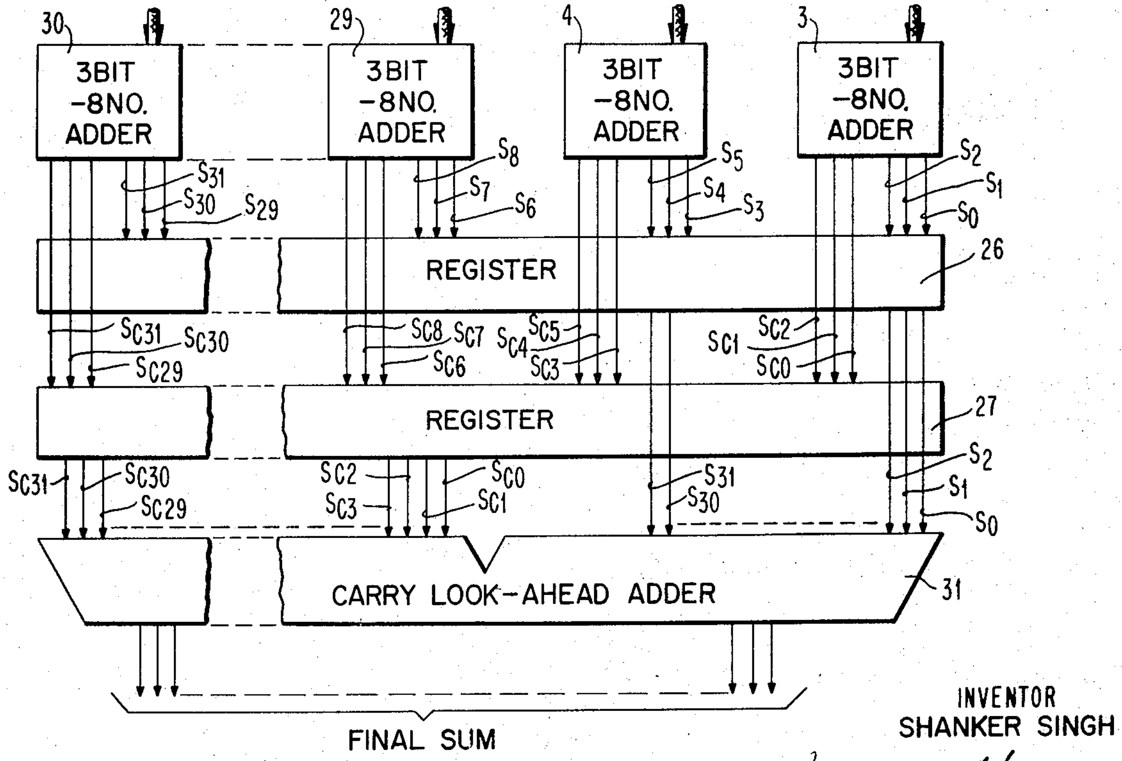
FIG. 2 is a simplified block diagram of the hardware logic required to process all of the groups of digits of the multiplicity of numbers to be added to provide a desired final sum.
Figure 3:
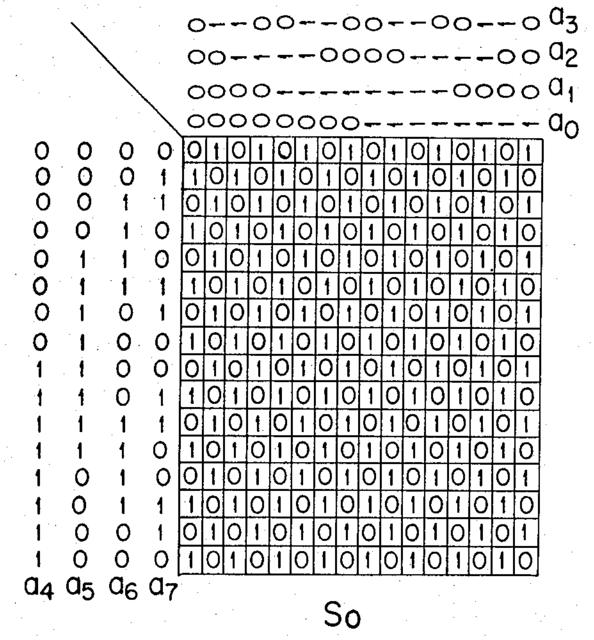
FIGS. 3, 4, 5 and 6 are matrices representing the logical functions provided by adder 2 of FIG. 1.
Figure 4:
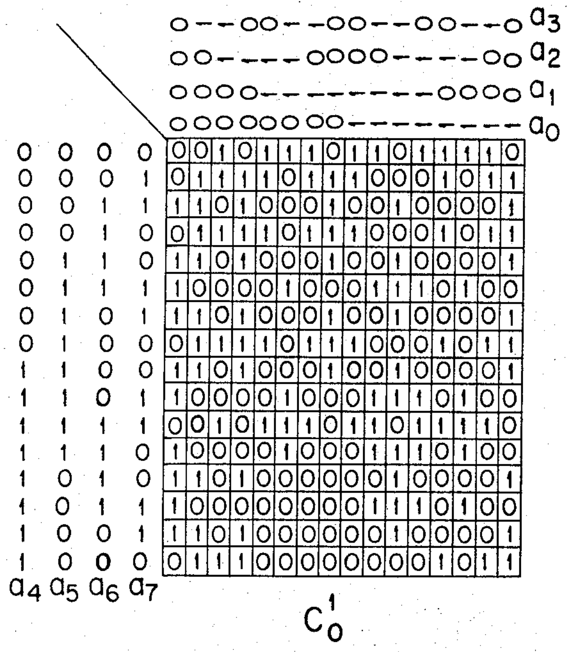
Figure 5:
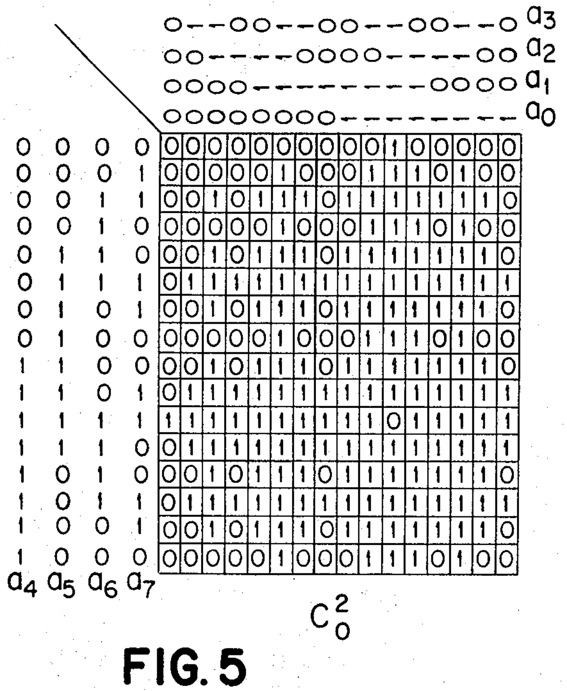
Figure 6:
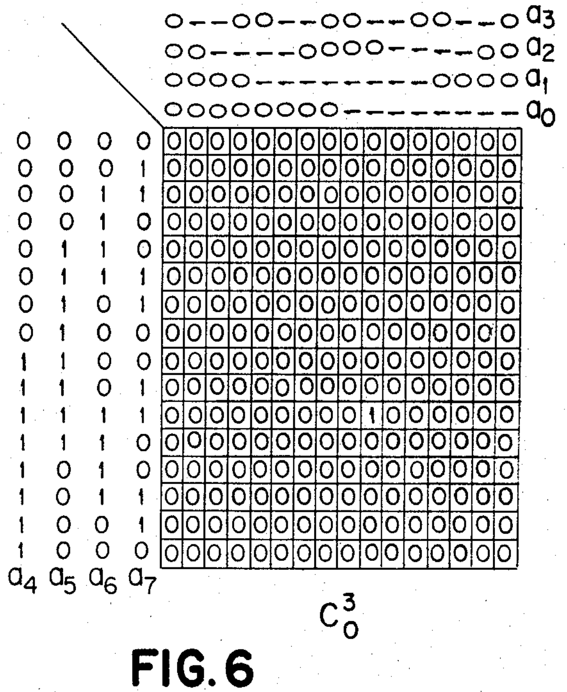

In the exemplary simplified embodiment of the present invention represented in FIGS. 1 and 2, it is assumed that eight numbers of 32 bits each are to be added together. The length of each number, i.e., the number of constituent bits, is not of particular concern to an understanding of the invention. The bits of the numbers to be added are inserted in shift register 1 in the order of their significance, the most significant bits being placed at the left in the view of the drawing. During the first cycle of computation, the most significant bits of all of the numbers to be added are shifted simultaneously from register 1 into adder 2. Adder 2 is the input stage to a three bit, eight number adder 3. Ten additional three bit adders identical to adder 3 also are provided as suggested by three bit adder 4. The total number of three bit adders required for the addition of eight numbers is determined in accordance with the expression $n = [\log_2 (k-1)]$ where $[\log_2 (k-1)]$ is the smallest integer greater or equal to $\log_2 (k-1)$, $n$ = the number of digits in each group of digits into which the bits comprising each number are divided and $k$ = *the number of numbers to be added. Thus, where* $k = 8$, $n = [\log_2 (7)] = 3$. Inasmuch as each 32 bit number is to be divided into groups of three digits, 11 three bit adders are provided. Alternatively, 10 three bit plus one two bit adders may be used for the 32 total bits.

Upon the application of the most significant digits of the first three bit group of digits from register 1 into adder 2, a sum digit appears at terminal 5 and carry digits appear at lines 6, 7 and 8 at the outputs of adder 2. Carry digit lines 6, 7 and 8 are connected to first inputs to adders 9, 10 and 11, respectively. Each of adders 9, 10 and 11 also receive additional inputs from the outputs of shift registers 12, 13 and 14, respectively. The inputs to registers 12, 13 and 14 are connected to sum digit terminals 5, 15 and 16 at the outputs from adders 2, 9, and 10, respectively. Registers 21 and 22 are similarly connected to sum digit terminals 17 and 18 at the outputs from adders 11 and 24. Adder 25 provides the most significant digit output from three bit adder 3.

In the second computational cycle, the contents of registers 12, 13, 14, 21 and 22 are shifted one place to the left. Then, the second most significant bits from all eight numbers to be added are applied to adder 2. Once again, the sum and respective carries are generated at terminal 5 and lines 6, 7 and 8, the carries being added to the shifted partial sum of the first cycle. The second cycle partial sum appears at appropriate ones of the sum output terminals 5, 15, 16, 17, 18 and 19.

In the third computational cycle, the contents of registers 12, 13, 14, 21 and 22 again are shifted one place to the left and the third least significant bits from the first three bit group of the numbers to be added are transferred from register 1 to adder 2. The third and final partial sum now is available at the sum output terminals 5, 15, 16, 17, 18 and 19. In order to reduce the carry ripple time in any computation cycle, the carry look ahead principle can also be applied. This can in turn increase the speed of adding. However, more hardware would be required for adders 10, 11, 24 and 25.

Eleven three bit adders identical to adder 3 of FIG. 1 are employed to process the 32 bit numbers being added in the exemplary embodiment. As shown in FIG. 2, the six digit partial sum outputs from each of the 11 three bit adders 3, 4, 29 . . . 30 are separated into two groups, each group being applied to a respective one of shift registers 26 and 27. The precise manner in which the partial sum digits are separated into two groups or numbers in the respective registers 26 and 27 is immaterial provided that the individual digits preserve proper positional significance. It is convenient to apply the three least significant digits from each of the 11 three bit adders to register 26 and to apply the three most significant bits from each of he 11 adders to register 27. Thus, the three least significant bits $S_0$, $S_1$ and $S_2$ from adder 3 become the three least significant bits of the numbers stored in register 26 whereas the next three bits $S_{C0}$, $S_{C1}$ and $S_{C2}$ from adder 3 become the three least significant bits of the number stored in register 27. Similarly, the three least significant bits $S_3$, $S_4$ and $S_5$ from adder 4 become the fourth, fifth and sixth least significant bits of the number stored in register 26 whereas bits $S_{C3}$, $S_{C4}$ and $S_{C5}$ from adder 4 become the fourth, fifth and sixth least significant bits of the number stored in register 27. The six bits from the remaining nine adders typified by adders 29 and 30 are similarly separated and applied to registers 26 and 27. It will be noted that each of the registers 26 and 27 receives 32 bits from the adders but also provides for three additional bits (at the left end of register 26 and at the right end of register 27) which are permanently zero. In this manner, all of the digits comprising the partial sum outputs from all 11 three bit adders are separated into two digit groups which are stored in registers 26 and 27 and transferred in the next computational cycle to conventional carry look-ahead adder 31 which, in turn, provides the desired final sum of the eight 32 bit numbers used in the example just described.

It should be observed that if the numbers to be added were divided into other than three digit groups, additional computational time would be required in order to achieve the desired final sum. For example, if each of the eight numbers were divided into groups of four digits each, one additional computation cycle would be required in order to transfer the additional digit column in each of the digit groups from shift register 1 to adder 2 of FIG. 1. If, on the other hand, each of the numbers to be added were divided into groups of two digits each, the overflows from adder 2 in the worst case (where the value of all digits in a given digit group were one) would propagate more than two bit positions. As a result, more than two digits (from all of the partial sums generated) would assume the same positional significance eliminating the possibility of separating the total number of digits into the two numbers in registers 26 and 27 as required for the operation of carry look-ahead adder 31. Once again, an additional computation cycle would be required to obtain the desired final sum. Accordingly, adherence to the previously described expression $n = [\log_2 (k-1)]$ provides the desired final sum in a minimum number of computation cycles, i.e., a number of computation cycles equaling one more than the number of digit columns in each digit group.

A feature of the present invention is that adders 9, 10, 11, 24 and 25 are simple in design and are structurally independent of the number of numbers to be added. Only adder 2 must increase in size as the number of numbers to be added increases. It is convenient to illustrate the logic function of adder 2 of FIG. 1 in terms of a Karnaugh map. Four separate maps represent the logical functions for producing the respective outputs $S_0$, $C_0^1$, $C_0^2$ and $C_0^3$ from adder 2 in response to the eight bits $a_0, a_1, \ldots a_7$ from register 1. The functions of the four memory matrices are represented by FIGS. 3, 4, 5 and 6.

The functions required to be performed by adders 9, 10, 11, 24 and 25 are defined by the following expressions:

LOGICAL FUNCTIONS FOR ADDER 9

$S_1 = S_0 \text{ (previous cycle) } \oplus C_0^1$ $C_1^1 = S_0 \text{ (previous cycle) } \bullet C_0^1$

LOGICAL FUNCTIONS FOR ADDER 10

$S_2 = S_1 \text{ (previous cycle) } \oplus C_1^1 \oplus C_0^2$ $C_2^1 = S_1 \text{ (previous cycle) } [C_1^1 + C_0^2] + C_2^1 C_0^3$

LOGICAL FUNCTIONS FOR ADDER 11

$S_{C0} = S_2 \text{ (previous cycle) } \oplus C_2^1 \oplus C_0^3$ $C_3^1 = S_2 \text{ (previous cycle) } [C_2^1 + C_0^3 + C_2^1 C_0^3$

LOGICAL FUNCTION FOR ADDER 24

$S_{C1} = S_{C0} \text{ (previous cycle) } \oplus C_3^1$ $C_4^1 = S_{C0} \text{ (previous cycle) } \bullet C_3^1$

LOGICAL FUNCTION FOR ADDER 25

$S_{C2} = S_{C1} \text{ (previous cycle) } \oplus C_4^1$ where: $\oplus$ = exclusive OR, $+$ = Inclusive OR, $\bullet$ = AND It will be recognized that a number of conventional computer system details have been omitted from the disclosure of the exemplary embodiment of the present invention for the sake of brevity and clarity of exposition. For example, the functions described above may be provided by logic circuits or memory arrays or combinations of both as is well understood by those skilled in the art. Additionally, computer system timing and control hardware has been omitted from FIGS. 1 and 2 but these also require no more than conventional computer system design techniques well known to those skilled in the art to accomplish the successive computational cycles involved in shifting the digits of the numbers to be added from register 1 and into adder 2 and subsequently into registers 12, 13, 14, 21 and 22 and into adders 9, 10, 11, 24 and 25 in proper timing sequence.

While this invention has been particularly described with reference to the preferred embodiments thereof, it will be understood by those skilled in the art that the foregoing and other changes in form and details may be made therein without departing from the spirit and scope of the invention.

What is claimed is:

1. A fast adder for processing in digit groups the digits of each of a plurality of numbers to be added in accordance with the expression $n = [\log_2 (k-1)]$ where:
   - $[\log_2 (k-1)]$ is the smallest integer greater or equal to $\log_2 (k-1)$ and
   - $n$ = the number of digits in each group and
   - $k$ = the number of numbers to be added, said fast adder comprising:
     - a plurality of adders equal to the number of said digit groups,
     - each said adder being connected to receive signals representing digits from a respective digit group,
     - a portion of said digit signals being applied to their respective adder during each of a plurality of computational cycles so that all digit signals are applied to their respective adders in a total of $n$ computational cycles,
     - each said adder producing sum and carry digit signals constituting a respective partial sum signal in response to each computational cycle,
     - a first register and a second register,
     - some of said sum and carry digit signals comprising each said partial sum signal being applied to said first register in each computational cycle,
     - the remainder of said sum and carry digit signals comprising each said partial sum signal being applied to said second register in each computational cycle, and
     - another adder connected to receive signals from said first and second registers representing the total sum and carry digit signals placed therein.

2. A fast adder for processing in digit groups the digits of each of a plurality of numbers to be added in accordance with the expression $n = [\log_2 (k-1)]$ where:
   - $[\log_2 (k-1)]$ is the smallest integer greater or equal to $\log_2 (k-1)$ and
   - $n$ = the number of digits in each group and
   - $k$ = the number of numbers to be added, said fast adder comprising:
     - a plurality of adders equal to the number of said digit groups,
     - each said adder being connected to receive signals representing digits having the same positional significance from a respective digit group,
     - said digit signals having the same positional significance from a respective digit group being applied to their respective adder during each of a plurality of computational cycles so that all digit signals are applied to their respective adders in a total of $n$ computational cycles,
     - each said adder producing sum and carry digit signals constituting a respective partial sum signal in response to each computational cycle,
     - a first register and a second register,
     - some of said sum and carry digit signals comprising each said partial sum signal being applied to said first register in each computational cycle,
     - the remainder of each sum and carry digit signals comprising each said partial sum signal being applied to said second register in each computational cycle, and
     - another adder connected to receive signals from said first and second registers representing the total sum and carry digit signals placed therein.

3. A fast adder as defined in claim 2 wherein
   - half of said sum and carry digit signals constituting each said partial sum signal are applied to said first register.

4. A fast adder as defined in claim 2 wherein said another adder is a carry look-ahead adder.

5. A fast adder as defined in claim 2 wherein said plurality of adders are identical to each other.

* * * * *